(12) United States Patent
Liu

(10) Patent No.: US 10,936,878 B2
(45) Date of Patent: Mar. 2, 2021

(54) METHOD AND DEVICE FOR DETERMINING INTER-CUT TIME RANGE IN MEDIA ITEM

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/663,009

(22) Filed: Oct. 24, 2019

(65) Prior Publication Data

US 2020/0057890 A1 Feb. 20, 2020

Related U.S. Application Data

(63) Continuation of application No. PCT/CN2018/084621, filed on Apr. 26, 2018.

(30) Foreign Application Priority Data

Apr. 28, 2017 (CN) .......................... 201710297149.4

(51) Int. Cl.
*G06K 9/00* (2006.01)
*H04N 21/81* (2011.01)
*H04N 21/845* (2011.01)

(52) U.S. Cl.
CPC ..... *G06K 9/00765* (2013.01); *G06K 9/00724* (2013.01); *H04N 21/8126* (2013.01); *H04N 21/845* (2013.01)

(58) Field of Classification Search
CPC .......... G06K 9/00765; G06K 9/00724; H04N 21/8126; H04N 21/845
See application file for complete search history.

(56) References Cited

U.S. PATENT DOCUMENTS

| 2004/0170392 A1* | 9/2004 | Lu ........................ G11B 27/28 386/240 |
| 2006/0013554 A1* | 1/2006 | Poslinski ................ H04N 5/76 386/213 |

(Continued)

FOREIGN PATENT DOCUMENTS

| CN | 1595970 | 3/2005 |
| CN | 101326584 | 12/2008 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Thai Q Tran
*Assistant Examiner* — Sunghyoun Park
(74) *Attorney, Agent, or Firm* — Fish & Richardson P.C.

(57) ABSTRACT

This specification describes techniques for determining an inter-cut time range in a media item. In one example method, a set of candidate segmentation points representing time points in a media item is determined, wherein each candidate segmentation point represents at least one of a time point at which feature media data appears in the media item, or a time point at which feature media data disappears from the media item. Based on the candidate segmentation points, an inter-cut time range is identified. The inter-cut time range is associated with a start point from the candidate segmentation points that satisfies a predetermined start point condition, and the inter-cut time range is associated with an end point from the candidate segmentation points that satisfies a predetermined end point condition. The inter-cut time range represents a time period between the start point and the end point in the media item.

12 Claims, 6 Drawing Sheets

(56) References Cited

U.S. PATENT DOCUMENTS

| | | | |
|---|---|---|---|
| 2011/0211812 A1 | 9/2011 | Tzoukermann et al. | |
| 2014/0019902 A1* | 1/2014 | DeLuca | G06F 3/04855 |
| | | | 715/772 |
| 2015/0003739 A1 | 1/2015 | Cho et al. | |
| 2016/0100226 A1 | 4/2016 | Sadler et al. | |

FOREIGN PATENT DOCUMENTS

| | | | |
|---|---|---|---|
| CN | 103024555 | 4/2013 | |
| CN | 104202668 | 12/2014 | |
| CN | 105763884 | 7/2016 | |
| CN | 105791914 | 7/2016 | |
| CN | 105847936 | 8/2016 | |
| EP | 2840801 | 2/2015 | |
| EP | 2840801 A2 * | 2/2015 | H05N 21/8456 |
| JP | 2011211481 | 11/2011 | |
| KR | 20080040895 | 5/2008 | |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2018/084621, dated Oct. 29, 2019, 7 pages (with English translation).

PCT International Search Report and Written Opinion in International Application No. PCT/CN2018/084621, dated Jul. 20, 2018, 13 pages (with English translation).

Supplementary European Search Report in European Application No. 187917422, dated Nov. 18, 2019, 13 pages.

Wang et al., "Multimedia Content Analysis—Using Both Audio and Visual Clues," Nov. 2000, IEEE Signal Processing Magazine, 17(6):12-36.

Extended European Search Report in European Application No. 18791742.2, dated Feb. 2, 2020, 11 pages.

* cited by examiner

US 10,936,878 B2

METHOD AND DEVICE FOR DETERMINING INTER-CUT TIME RANGE IN MEDIA ITEM

CROSS-REFERENCE TO RELATED APPLICATIONS

This application is a continuation of PCT Application No. PCT/CN2018/084621, filed on Apr. 26, 2018, which claims priority to Chinese Patent Application No. 201710297149.4, filed on Apr. 28, 2017, and each application is hereby incorporated by reference in its entirety.

TECHNICAL FIELD

The present application relates to the field of data processing technologies, and in particular, to a method and a device for determining an inter-cut time bucket in an audio or a video.

BACKGROUND

Television program playback is an important component of video content provided on many video websites. A recorded television program video usually includes a program period and an inter-cut time bucket (e.g. a commercial break). The program period is a period for playing program content. The inter-cut time bucket is a period for playing non-program content, for example, an advertisement period in a movie or an episode of TV series, or an advertisement period or a live broadcast room comment period for filling a half-time break in a live program of a sports game.

When watching a playback video, few users wait patiently during the inter-cut time bucket. Instead, the users usually skip the inter-cut time bucket by dragging a progress bar. The users usually need to adjust the progress bar back and forth because it is difficult to accurately skip the inter-cut time bucket through one-time dragging, which affects user experience. Therefore, the inter-cut time bucket is usually removed from the program video when the playback video is produced.

In the existing technology, a video producer manually identifies an inter-cut time bucket in a video, and then cuts the inter-cut time bucket off the video. The present method is tedious, time-consuming, and inefficient, and therefore, is hard to satisfy the demand for putting the playback video online in time.

SUMMARY

In view of this, the present application provides a method for determining an inter-cut time bucket in an audio or a video, including the following: determining, as a candidate segmentation point, at least one of a time point at which feature media data appears in an audio or a video or a time point at which feature media data disappears from an audio or a video; and determining a candidate segmentation point satisfying a predetermined start point condition as a start point, determining a candidate segmentation point satisfying a predetermined end point condition as an end point, and determining a period between the start point and the end point as an inter-cut time bucket.

The present application further provides a device for determining an inter-cut time bucket in an audio or a video, including: a candidate segmentation point unit, configured to use, as a candidate segmentation point, at least one of a time point at which feature media data appears in an audio or a video or a time point at which feature media data disappears from an audio or a video; and a start point and end point unit, configured to use a candidate segmentation point satisfying a predetermined start point condition as a start point, use a candidate segmentation point satisfying a predetermined end point condition as an end point, and use a period between the start point and the end point as an inter-cut time bucket.

It can be seen from the previous technical solutions that, in the present implementations of the present application, whether feature media data is presented in an audio or a video at a certain time point is used as a basis for distinguishing between a program period and an inter-cut time bucket. In at least one of a time point at which the feature media data appears or a time point at which the feature media data disappears, one satisfying a predetermined start point condition is used as a start point of the inter-cut time bucket, and the other satisfying a predetermined end point condition is used as an end point of the inter-cut time bucket. The inter-cut time bucket in the audio/video can be automatically identified without manual identification. As such, during playback video production, manual workloads on the producer can be greatly alleviated, a period for producing the playback video can be shortened, and improving production efficiency.

DESCRIPTION OF IMPLEMENTATIONS

In an audio or a video including an inter-cut time bucket, especially, a recorded video of a television program, generally, audio/video content in a program period or the inter-cut time bucket has obvious identifiable features. For example, in an advertisement insertion period in the middle of a movie or TV series, a countdown of the advertisement insertion period is constantly displayed, "To be continued later" is constantly displayed, etc. For another example, generally, a scoreboard is constantly displayed in a program period of a sports game. The at least one of appearance or disappearance of these identifiable features can be used as a basis for division between a program period and an inter-cut time bucket.

Therefore, an implementation of the present application provides a new method for determining an inter-cut time bucket in an audio or a video. The method includes the following: determining, as a candidate segmentation point between the program period and the inter-cut time bucket, at least one of a time point at which feature media data of the identifiable feature appears or a time point at which feature media data of the identifiable feature disappears; and determining a candidate segmentation point satisfying a predetermined start point condition as a start point of the inter-cut time bucket, and determining a candidate segmentation point satisfying a predetermined end point condition as an end point of the inter-cut time bucket. As such, the inter-cut time bucket in the audio/video can be automatically identified without manual identification. Manual workloads on the producer can be greatly alleviated, and a speed for producing the video can be fastened, improving production efficiency, and alleviating a problem in the existing technology.

The present implementations of the present application can be applied to any device having computing and storage capabilities, such as a mobile phone, a tablet computer, a personal computer (PC), a notebook, or a server. Each function in the present implementations of the present application can be further implemented by a logical node running on two or more devices.

Figure 1:
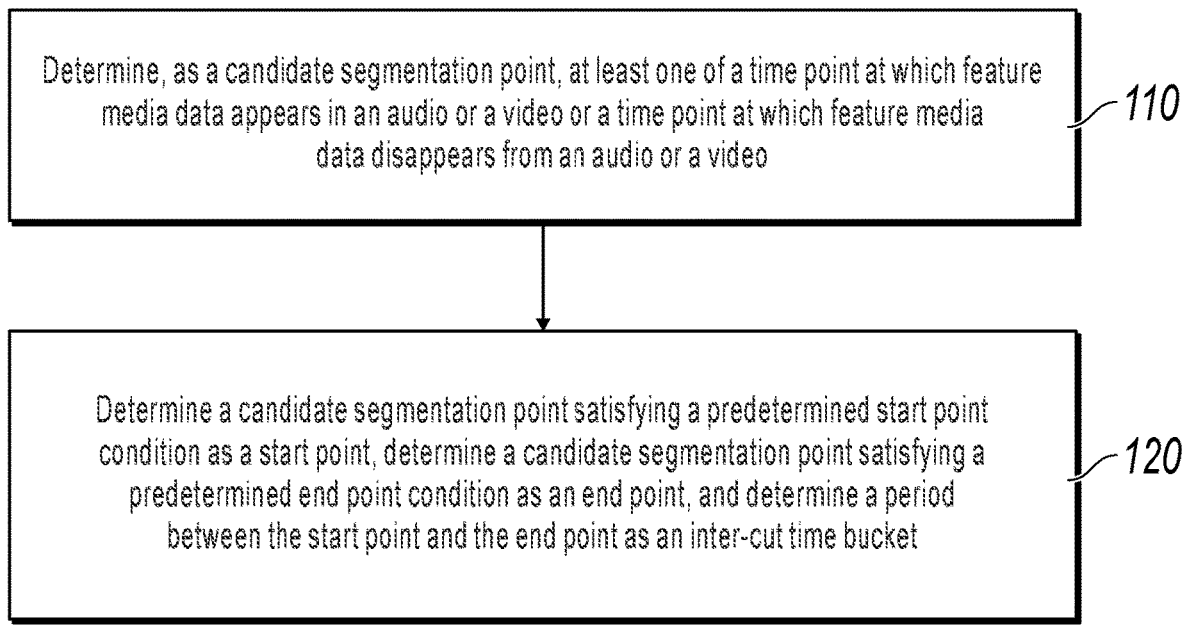
FIG. 1 is a flowchart illustrating a method for determining an inter-cut time bucket in an audio or a video, according to an implementation of the present application.

FIG. 1 is a flowchart illustrating a method for determining an inter-cut time bucket in an audio or a video, according to an implementation of the present application.

Step 110: Use, as a candidate segmentation point, at least one of a time point at which feature media data appears in an audio or a video or a time point at which feature media data disappears from an audio or a video.

In the present implementation of the present application, a program period and an inter-cut time bucket in the audio/video can be divided based on a demand in an actual application scenario. This is not limited. For example, a pause period in a sport game program can be used as a program period, or can be used as an inter-cut time bucket.

At least one of an image feature or a sound feature that appears or disappears when switching is performed between the program period and the inter-cut time bucket can be used as the feature media data after the program period and the inter-cut time bucket are determined. The at least one of the time point at which the feature media data appears in the audio/video or the time point at which the feature media data disappears from the audio/video is identified as the candidate segmentation point.

For the video, the feature media data can be a feature image in a video picture or a feature sound in a video sound. For the audio, the feature media data is generally a feature sound in the audio. It is worthwhile to note that the feature image can be all or a part of a video picture and the feature sound can be all or a part of a band of the audio, for example, a sound with at least one of a predetermined volume, tone, or timbre. This is not limited in the present implementation of the present application.

The video picture, the video sound, or the audio sound is analyzed to identify whether the current video picture, the video sound, or the audio sound has the feature media data, thereby further identifying the at least one of the time point at which the feature media data appears or the time point at which the feature media data disappears.

When the feature image is a part of the video picture and the feature image always appears in a predetermined area in the picture, at least one of a color ratio or an image shape of the predetermined area in the video picture can be analyzed, and at least one of the time point at which the feature image appears in the predetermined area or the time point at which the feature image disappears from the predetermined area is identified. A scoreboard in a sports game video is used as an example. Assuming that the scoreboard is not displayed in a certain frame but is displayed in a next frame, a time point between the two frames is a candidate segmentation point.

There can be one or more pieces of feature media data for a certain audio/video or a certain type of audio/video. For example, for a sports game video, a scoreboard can be used as the feature media data, or both a scoreboard and a long whistling in a game pause can be used as the feature media data. For another example, for a movie or a television program video, at least one of displayed "To be continued later" or a displayed countdown for an advertisement period can be used as the feature media data.

Based on a method for presenting feature media data in an actual application scenario, at least one of a time point at which certain feature media data appears or a time point at which certain feature media data disappears can be used as a candidate segmentation point. For example, for a countdown displayed in an advertisement insertion period, if a countdown is displayed throughout an advertisement insertion period in a certain video, both a time point at which the countdown appears and a time point at which the countdown disappears can be used as candidate segmentation points. If a countdown is displayed only before an advertisement insertion period is about to end in a certain video, instead of a time point at which the displayed countdown appears, a time point at which the displayed countdown disappears is used as a candidate segmentation point.

Step 120: Use a candidate segmentation point satisfying a predetermined start point condition as a start point, use a candidate segmentation point satisfying a predetermined end point condition as an end point, and use a period between the start point and the end point as an inter-cut time bucket.

For the candidate segmentation point, based on a method for presenting selected feature media data in an audio or a video, a change representing a start of the inter-cut time bucket is used as the predetermined start point condition, and a change representing an end of the inter-cut time bucket is used as the predetermined end point condition, to determine a start time point and an end time point of one or more spot periods from candidate segmentation points. As such, each spot period is determined from the audio/video.

For the video, the feature media data can be one or more feature images in a video picture. When a certain feature image can be used for determining a start point of an inter-cut time bucket, a predetermined start point condition can be that the feature image appears or disappears. When a certain feature image can be used for determining an end point of an inter-cut time bucket, a predetermined end point condition can be that the feature image appears or disappears. When a certain feature image can be used for determining both a start point and an end point of an inter-cut time bucket, a predetermined start point condition can be that the feature image appears or disappears, and a corresponding predetermined end point condition can be that the feature image disappears or appears.

For example, when "To be continued later" displayed in the advertisement period can generally be used for determining a start of the inter-cut time bucket, a corresponding predetermined start point condition is that "To be continued later" appears; when a countdown displayed in the advertisement period is used for determining an end of the inter-cut time bucket, a corresponding predetermined end point condition can be that the countdown disappears.

Similarly, the feature media data can be one or more feature sounds for the audio/video. When a certain feature sound can be used for determining a start point of an inter-cut time bucket, a predetermined start point condition can be that the feature sound appears or disappears. When a certain feature sound can be used for determining an end point of an inter-cut time bucket, a predetermined end point condition can be that the feature sound appears or disappears. When a certain feature sound can be used for determining both a start point and an end point of an inter-cut time bucket, a predetermined start point condition can be that the feature sound appears or disappears, and a corresponding predetermined end point condition can be that the feature sound disappears or appears.

When two or more pieces of feature media data are used, at least one of a relatively complex predetermined start point condition or a relatively complex predetermined end point condition can be used based on a method for displaying the feature media data in an actual application scenario. For example, when a playback video of a sports game is produced, a pause period, an advertisement period, and a live broadcast room period of the game are used as spot periods, and two types of feature media data: a scoreboard and a long whistling for a pause can be used. In the present scenario, the scoreboard is not displayed in the advertisement period or the live broadcast room period but is displayed in the pause period. In addition, the advertisement period or the live broadcast room period is usually after the pause period starts, and the pause period may end or not end after the advertisement period or the live broadcast room period ends. As such, a predetermined start point condition can be that the long whistling for a pause appears and the scoreboard does not disappear in a previous first predetermined waiting period, or that the scoreboard disappears; a predetermined end point condition can be that the scoreboard appears and the long whistling for a pause does not appear in a following second predetermined waiting period, or that the long whistling for a pause appears and a period between a time point at which the long whistling for a pause appears and a time point at which the long whistling for a pause appears last time does not exceed a third predetermined waiting period.

The candidate segmentation point satisfying the predetermined start point condition is used as the start point of the inter-cut time bucket, the candidate segmentation point satisfying the predetermined end point condition is used as the end point of the inter-cut time bucket, and the period between the start point and the end point is the inter-cut time bucket. It is worthwhile to note that there can be one or more spot periods in the audio/video, and each spot period can be determined based on the method in the present implementation of the present application.

After the inter-cut time bucket in the audio/video is determined, different colors can be used in a progress bar to show an area corresponding to the inter-cut time bucket and an area corresponding to a non-spot period (namely, the program period) when the audio/video is played. As such, a user can conveniently jump to a next program period by dragging the progress bar. Alternatively, all spot periods may not be played and only the program period can be played when the audio/video is played. Alternatively, the inter-cut time bucket can be deleted from the audio/video, and a video version obtained after the inter-cut time bucket is deleted and only the program period is left is used during audio/video playing.

It can be seen that, in the present implementation of the present application, an identifiable feature can be used as the feature media data for distinguishing between the program period and the inter-cut time bucket. In at least one of the time point at which the feature media data appears or the time point at which the feature media data disappears, one satisfying the predetermined start point condition is used as the start point of the inter-cut time bucket, and the other satisfying the predetermined end point condition is used as the end point of the inter-cut time bucket. The inter-cut time bucket in the audio/video can be automatically identified without manual identification. As such, manual workloads on the producer can be greatly alleviated, improving a video production speed and video production efficiency.

Figure 2:
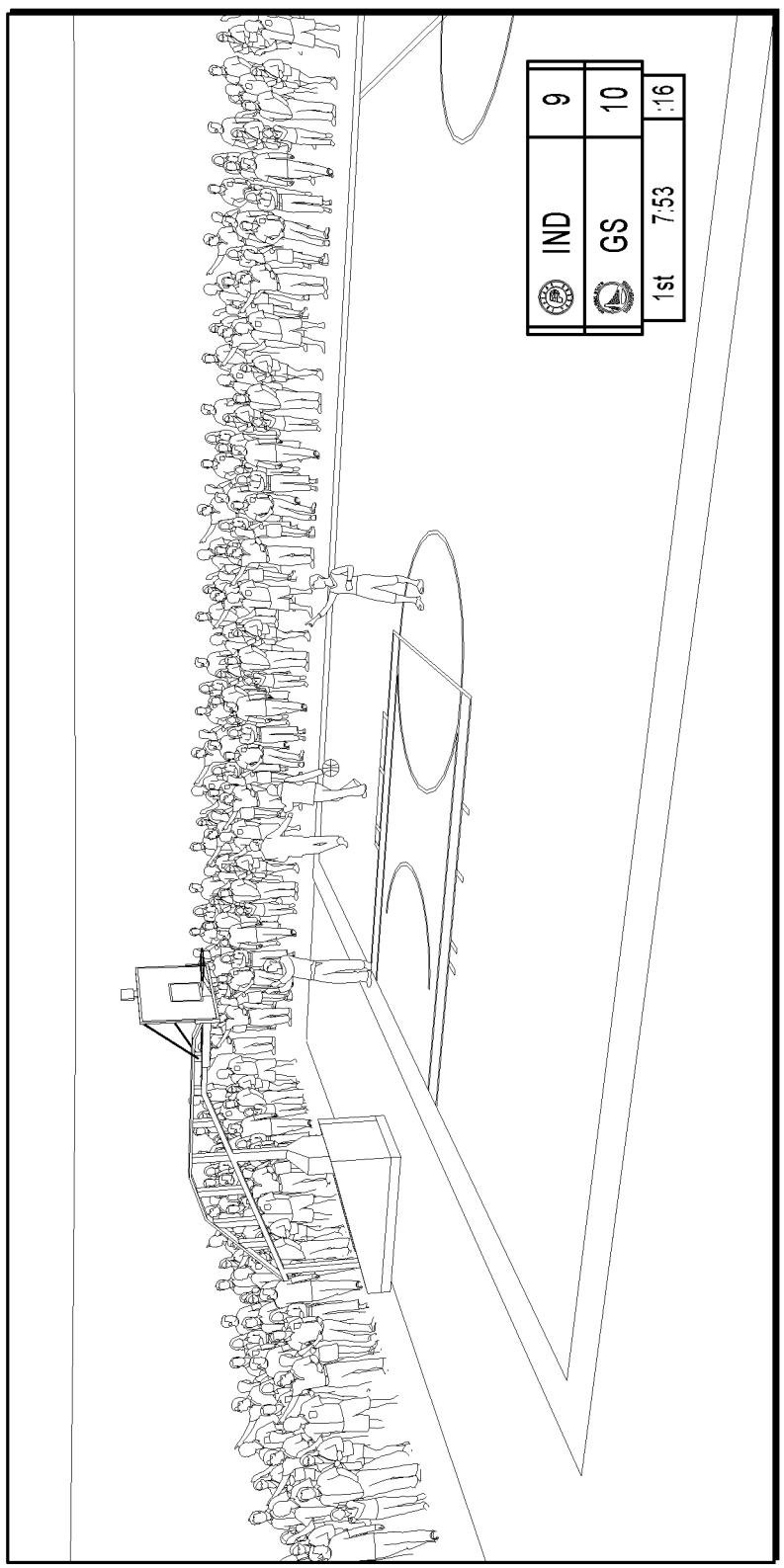
FIG. 2 is an example diagram illustrating a video picture with a feature image displayed, according to an application example of the present application.

In an application example of the present application, after recording a television live broadcast NBA game video, the producer wants to make the video as a playback video. In addition to a game period, a television live broadcast program further includes an advertisement period and a live broadcast room period. During video production, a game period is a program period in the video, and an advertisement period and a live broadcast room period are spot periods. In the game period of the video, a scoreboard is always displayed at the lower right corner of a picture, as shown in FIG. 2, while the scoreboard is not displayed in the advertisement period and the live room period. Therefore, the producer determines a display area including the scoreboard at the lower right corner of the picture as a predetermined area, and determines the displayed scoreboard as a feature image.

The device running the present implementation of the present application extracts each frame from the video, and analyzes a color ratio and an image shape of a predetermined area in the frame. As such, whether the scoreboard is displayed in the frame can be identified. When the scoreboard is displayed in a previous frame but is not displayed in a following frame, or the scoreboard is not displayed in a previous frame but is displayed in a following frame, a time point between the two frames is used as a candidate segmentation point. A candidate segmentation point at which the scoreboard disappears (a predetermined start point condition) is used as a start point of an inter-cut time bucket, and a candidate segmentation point at which the scoreboard appears (a predetermined end point condition) is used as an end point of the inter-cut time bucket, so that spot periods are divided in the video.

Figure 3:
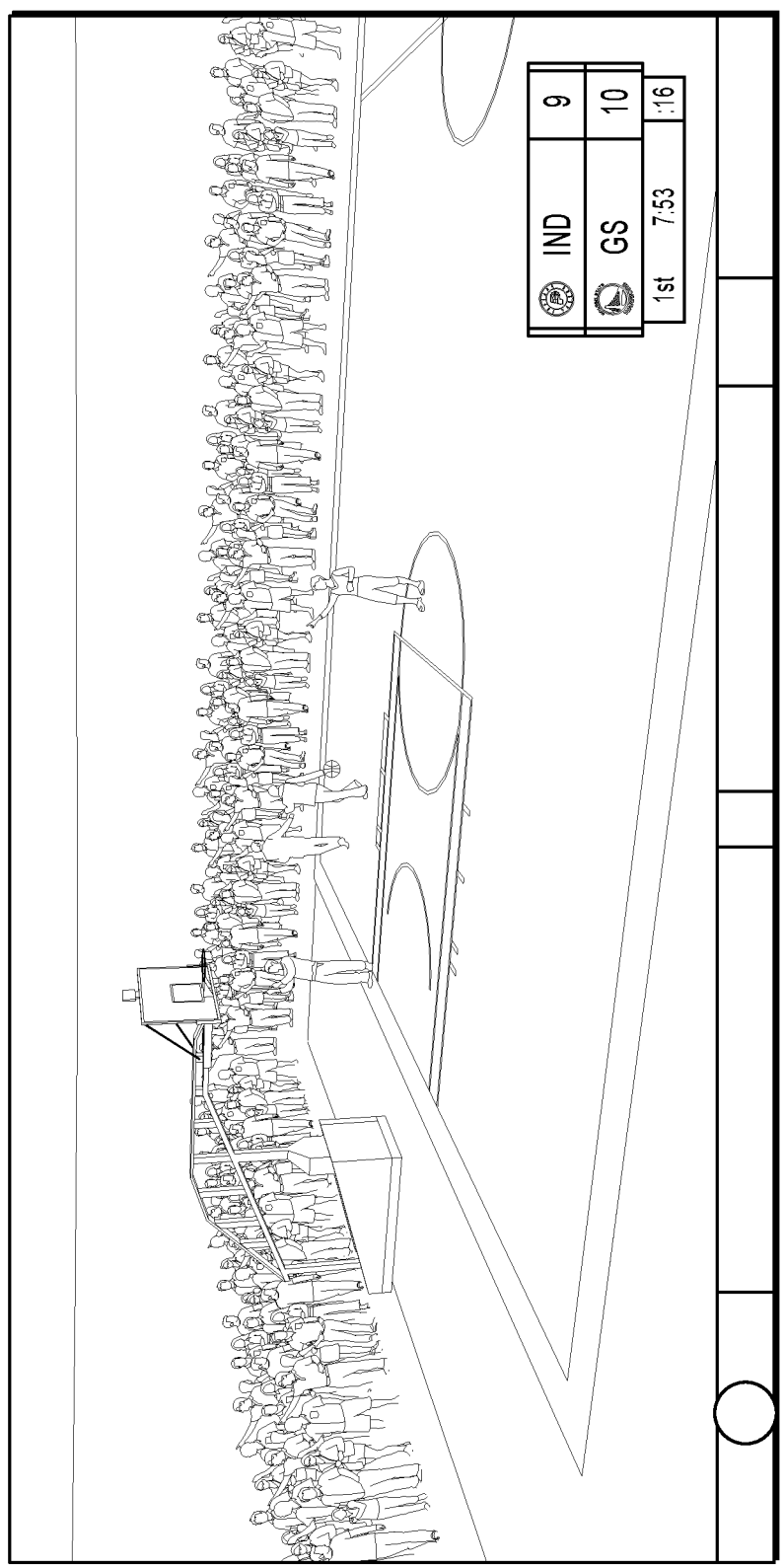
FIG. 3 is an example diagram illustrating a playback progress bar in which an area corresponding to an inter-cut time bucket is presented by using a different color, according to an application example of the present application.

The device running the present implementation of the present application can delete the inter-cut time bucket from the video, and use a video obtained after the deletion as a playback video to be played for the user. Alternatively, for example, as shown in FIG. 3, the recorded video can be used as a playback video, and different colors are used in a progress bar to show an area corresponding to the inter-cut time bucket and an area corresponding to the program period when the video is played, so that the user can accurately skip the inter-cut time bucket.

Figure 4:
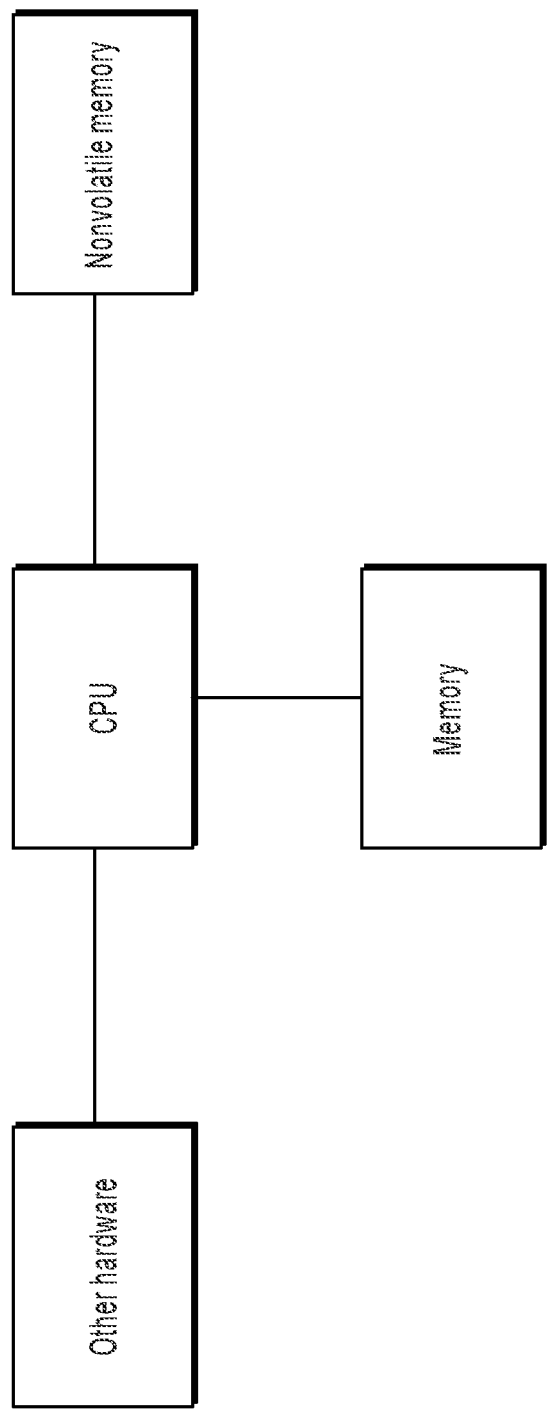
FIG. 4 is a structural diagram illustrating hardware of a device for running an implementation of the present application.

Corresponding to the previous procedure implementation, an implementation of the present application further provides a device for determining an inter-cut time bucket in an audio or a video. The device can be implemented by software, can be implemented by hardware, or can be implemented by a combination of hardware and software. Software implementation is used as an example. As a logical apparatus, the software is formed by reading a corresponding computer program instruction to a memory by using a central processing unit (CPU) in a device in which the software is located and running the computer program instruction. In terms of hardware implementation, in addition to the CPU, the memory, and the nonvolatile memory shown in FIG. 4, the device in which the device for determining an inter-cut time bucket in an audio or a video is located generally further includes at least one of the following: other hardware such as a chip for sending and receiving radio signals, or other hardware such as a card configured to implement a network communication function.

Figure 5:
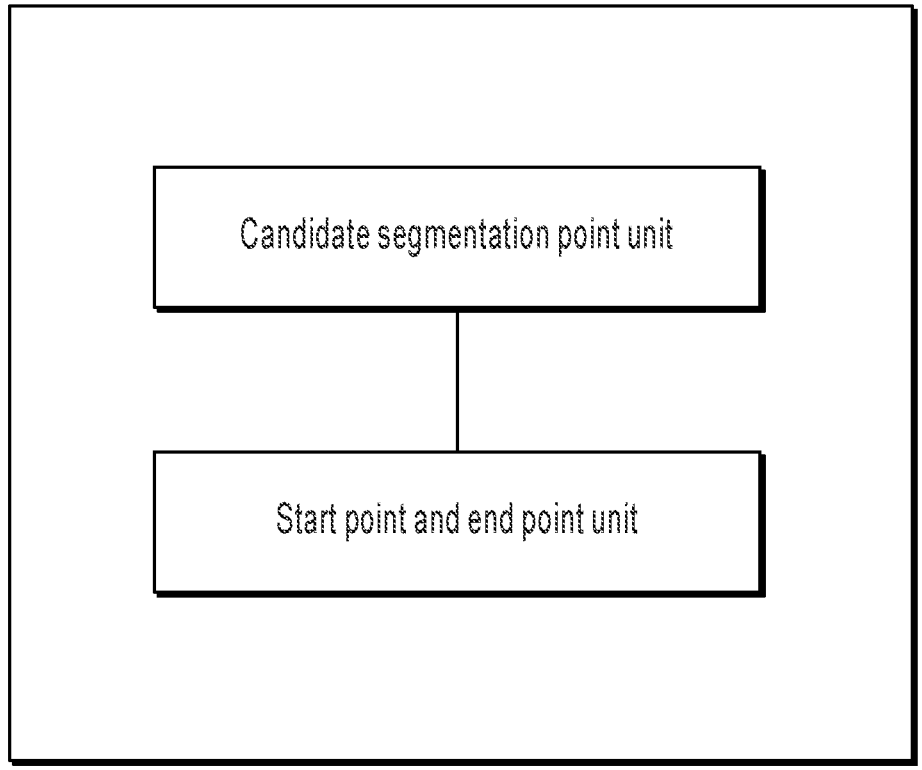
FIG. 5 is a logic structural diagram illustrating a device for determining an inter-cut time bucket in an audio or a video, according to an implementation of the present application.

FIG. 5 shows a device for determining an inter-cut time bucket in an audio or a video according to an implementation of the present application. The device includes a candidate segmentation point unit and a start point and end point unit. The candidate segmentation point unit is configured to use, as a candidate segmentation point, at least one of a time point at which feature media data appears in an audio or a video or a time point at which feature media data disappears from an audio or a video. The start point and end point unit is configured to use a candidate segmentation point satisfying a predetermined start point condition as a start point, use a candidate segmentation point satisfying a predetermined end point condition as an end point, and use a period between the start point and the end point as an inter-cut time bucket.

Optionally, the feature media data includes a feature image in a video picture, and the predetermined start point condition includes that the feature image appears in or disappears from the video picture.

Optionally, the feature media data includes a feature image in a video picture, and the predetermined end point condition includes that the feature image disappears from or appears in the video picture.

Optionally, the feature image is located in a predetermined area of the video picture, and the candidate segmentation point unit is configured to analyze at least one of a color ratio or an image shape of the predetermined area in the video picture, and identify, as the candidate segmentation point, at least one of the time point at which the feature image appears in the predetermined area or the time point at which the feature image disappears from the predetermined area.

Optionally, the feature image includes a scoreboard in a sports game video.

Optionally, the feature media data includes a feature sound in the audio/video, and the predetermined start point condition includes a time point at which the feature sound appears in or disappears from the audio/video.

Optionally, the feature media data includes a feature sound in the audio/video, and the predetermined end point condition includes a time point at which the feature sound disappears from or appears in the audio/video.

Optionally, the feature sound includes a sound with at least one of a predetermined volume, tone, or timbre.

Optionally, the device further includes: a unit for playing and changing an audio or a video, configured to use different colors in a progress bar to show an area corresponding to the inter-cut time bucket and an area corresponding to a non-spot period when the audio/video is played; or skip displaying the inter-cut time bucket when the audio/video is played; or delete the inter-cut time bucket from the audio/video.

The previous descriptions are merely examples of the present implementations of the present application, but are not intended to limit the present application. Any modification, equivalent replacement, or improvement made without departing from the spirit and principle of the present application should fall within the protection scope of the present application.

In a typical configuration, a computing device includes one or more central processing units (CPU), one or more input/output interfaces, one or more network interfaces, and one or more memories.

The memory can include a non-persistent memory, a random access memory (RAM), a nonvolatile memory, etc. in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to: a parameter random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. As described in the present application, the computer readable medium does not include computer readable transitory media such as a modulated data signal and a carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

Figure 6:
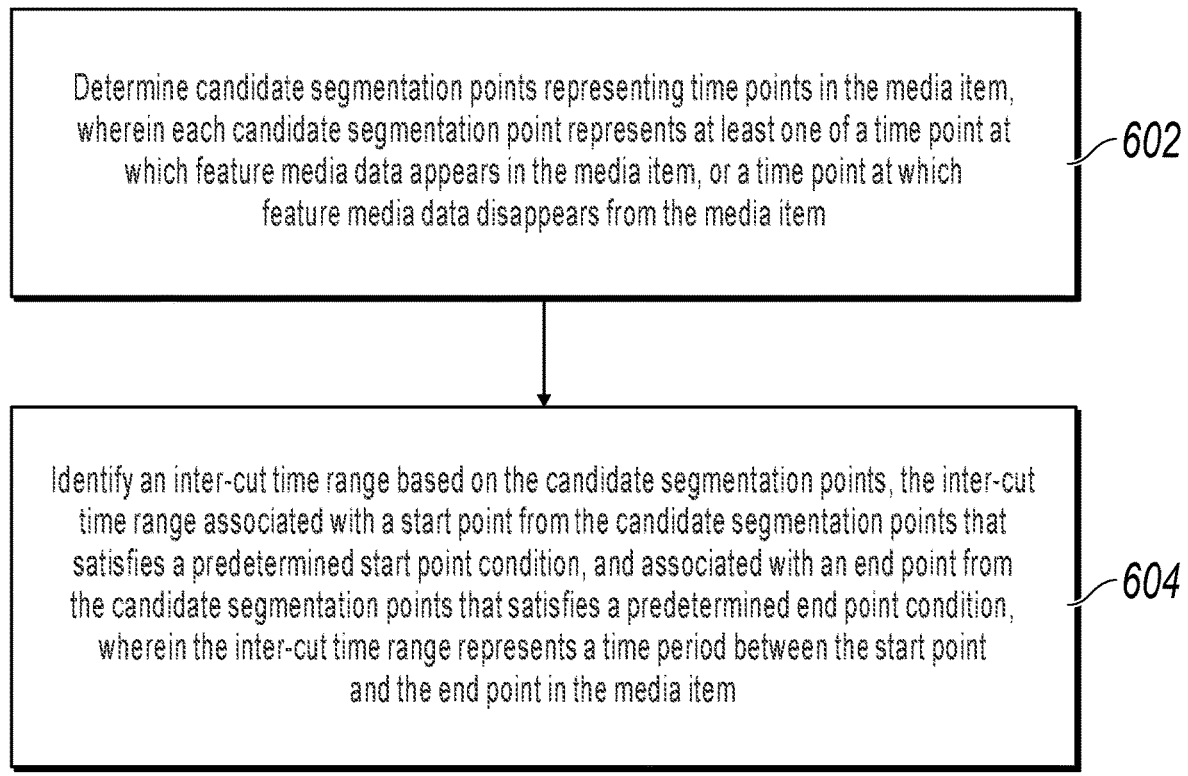
FIG. 6 is a flowchart illustrating an example of a computer-implemented method for determining an inter-cut time range in a media item, according to an implementation of the present disclosure.

FIG. 6 is a flowchart illustrating an example of a computer-implemented method 600 for determining an inter-cut time range in a media item, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 400 can be run in parallel, in combination, in loops, or in any order.

At 602, candidate segmentation points representing time points in a media item are determined, wherein each candidate segmentation point represents at least one of a time point at which feature media data appears in the media item, or a time point at which feature media data disappears from the media item. From 602, method 600 proceeds to 604.

At 604, based on the candidate segmentation points, an inter-cut time range is identified. The inter-cut time range is associated with a start point from the candidate segmentation points that satisfies a predetermined start point condition, and the inter-cut time range is associated with an end point from the candidate segmentation points that satisfies a predetermined end point condition. The inter-cut time range represents a time period between the start point and the end point in the media item. In some cases, after 604, method 600 stops.

In some implementations, the feature media data comprises a feature image in a video picture produced by playing the media item.

In some implementations, the predetermined start point condition comprises that the feature image appears in or disappears from the video picture.

In some implementations, the predetermined end point condition comprises that the feature image disappears from or appears in the video picture.

In some implementations, the feature image is located in a predetermined area in the video picture, and determining the candidate segment points comprises: 1) analyzing at least one of a color ratio or a graphics shape of the predetermined area in the video picture and 2) identifying, as a candidate segmentation point, at least one of a time point at which the feature image appears in the predetermined area or a time point at which the feature image disappears from the predetermined area.

In some implementations, the feature image comprises a scoreboard in a sports game video.

In some implementations, the feature media data comprises a feature sound in the media item.

In some implementations, the feature sound comprises a sound with at least one of a predetermined volume, tone, or timbre, and wherein the predetermined start point condition comprises a time point at which the feature sound appears in or disappears from the media item.

In some implementations, the feature sound comprises a sound with at least one of a predetermined volume, tone, or timbre, and wherein the predetermined end point condition comprises a time point at which the feature sound disappears from or appears in the media item.

In some implementations, the feature sound comprises a sound with at least one of a predetermined volume, tone, or timbre.

In some implementations, after 604, the method 600 further comprises: using different colors in a progress bar to show an area corresponding to the inter-cut time range and an area corresponding to a non-spot period when the media item is played.

In some implementations, after 604, the method 600 further comprises: skipping the inter-cut time range when the media item is played.

In some implementations, after 604, the method 600 further comprises: deleting the inter-cut time range from the media item.

The described subject matter provides various technical advantages and effects. For example, in some implementations, an identifiable feature can be used as the feature media data for distinguishing between the program range and inter-cut time ranges. Start and end points for an inter-cut time range can be identified based on their satisfaction of predetermined start and end point conditions. In some cases, a time point at which the feature media data appears can be used as the start point of an inter-cut time range, and a time point at which the feature media data disappears can be used as the end point of the inter-cut time range. In some cases, the inter-cut time range in the media item can be automatically identified in this way, thereby increasing the speed and efficiency of media production.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for determining an inter-cut time range in a media item, comprising:

determining candidate segmentation points representing time points in the media item, wherein each candidate segmentation point represents a start time point at which a feature image displayed in a first video picture produced at a first time during playing the media item is not displayed in a second video picture produced at a second time during playing the media item and a feature sound associated with the feature image is produced when the feature image is not displayed in the second video picture at the second time, and an end time point at which the feature image is displayed in a third video picture produced at a third time during playing the media item after the second time and the feature sound associated with the feature image in the third video picture is not produced at the third time during playing the media item; and identifying an inter-cut time range based on the candidate segmentation points, the inter-cut time range representing a time period between the start time point from the candidate segmentation points and the end time point from the candidate segmentation points.

2. The computer-implemented method of claim 1 wherein the feature image is located in a predetermined area in the second video picture, and wherein determining the candidate segmentation points comprises:

analyzing at least one of a color ratio or a graphics shape of the predetermined area in the second video picture; and identifying, as a candidate segmentation point, at least one of a time point at which the feature image appears in the predetermined area at the third time or a time point at which the feature image does not appear in the predetermined area at the second time.

3. The method according to claim 1, wherein the feature image comprises a scoreboard in a sports game video.

4. The computer-implemented method of claim 1, wherein the feature sound comprises a sound with at least one of a predetermined volume, tone, or timbre.

5. The computer-implemented method of claim 1, further comprising, during playing of the media item at a fourth time, using different colors in a progress bar to show an area corresponding to the inter-cut time range and an area corresponding to a non-spot period.

6. The computer-implemented method of claim 1, further comprising, during playing of the media item at a fourth time, skipping the inter-cut time range.

7. The computer-implemented method of claim 1, further comprising, during playing of the media item at a fourth time, deleting the inter-cut time range from the media item.

8. A non-transitory, computer-readable medium storing one or more instructions executable by a computer system to perform operations comprising:
- determining candidate segmentation points representing time points in a media item, wherein each candidate segmentation point represents a start time point at which a feature image displayed in a first video picture produced at a first time during playing the media item is not displayed in a second video picture produced at a second time during playing the media item and a feature sound associated with the feature image is produced when the feature image is not displayed in the second video picture at the second time, and an end time point at which the feature image is displayed in a third video picture produced at a third time during playing the media item after the second time and the feature sound associated with the feature image in the third video picture is not produced at the third time during playing the media item; and
- identifying an inter-cut time range based on the candidate segmentation points, the inter-cut time range representing a time period between the start time point from the candidate segmentation points and the end time point from the candidate segmentation points.

9. The non-transitory, computer-readable medium of claim 8, wherein the feature image is located in a predetermined area in the second video picture, and wherein determining the candidate segmentation points comprises:
- analyzing at least one of a color ratio or a graphics shape of the predetermined area in the second video picture; and
- identifying, as a candidate segmentation point, at least one of a time point at which the feature image appears in the predetermined area at the third time or a time point at which the feature image does not appear in the predetermined area at the second time.

10. The non-transitory, computer-readable medium of claim 8, wherein the feature image comprises a scoreboard in a sports game video.

11. The non-transitory, computer-readable medium of claim 8, wherein the feature sound comprises a sound with at least one of a predetermined volume, tone, or timbre.

12. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
    - determining candidate segmentation points representing time points in a media item, wherein each candidate segmentation point represents a start time point at which a feature image displayed in a first video picture produced at a first time during playing the media item is not displayed in a second video picture produced at a second time during playing the media item and a feature sound associated with the feature image is produced when the feature image is not displayed in the second video picture at the second time, and an end time point at which the feature image is displayed in a third video picture produced at a third time during playing the media item after the second time and the feature sound associated with the feature image in the third video picture is not produced at the third time during playing the media item; and
    - identifying an inter-cut time range based on the candidate segmentation points, the inter-cut time range representing a time period between the start time point from the candidate segmentation points and the end time point from the candidate segmentation points.

* * * * *